United States Patent
Silverbrook (10) Patent No.: US 7,637,677 B2
(45) Date of Patent: *Dec. 29, 2009

(54) CELLULAR PHONE CHARGING STAND

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/194,532

(22) Filed: Aug. 19, 2008

(65) Prior Publication Data

US 2008/0303481 A1    Dec. 11, 2008

Related U.S. Application Data

(63) Continuation of application No. 11/474,280, filed on Jun. 26, 2006, now Pat. No. 7,431,519, which is a continuation of application No. 10/503,901, filed as application No. PCT/AU03/00170 on Feb. 12, 2003, now Pat. No. 7,108,437.

(30) Foreign Application Priority Data

Feb. 13, 2002  (AU) ........................... PS0492
Feb. 13, 2002  (AU) ........................... PS0493

(51) Int. Cl.
  *B41J 2/175*  (2006.01)
  *B41J 2/01*   (2006.01)
  *B41J 3/36*   (2006.01)

(52) U.S. Cl. ....................... 400/88; 347/86; 347/85; 347/84; 347/109

(58) Field of Classification Search ................. None
See application file for complete search history.

(56) References Cited

U.S. PATENT DOCUMENTS

| | | | |
|---|---|---|---|
| 4,168,533 A | 9/1979 | Schwartz | |
| 5,734,254 A | 3/1998 | Stephens | |
| 5,754,962 A * | 5/1998 | Griffin | 455/569.2 |
| 6,112,414 A * | 9/2000 | Andis et al. | 30/231 |
| 6,149,256 A | 11/2000 | McIntyre et al. | |
| 6,164,770 A | 12/2000 | Takata | |
| 6,299,269 B1 * | 10/2001 | Davies et al. | 347/2 |
| 6,464,317 B2 | 10/2002 | Miyazawa | |
| 6,467,688 B1 | 10/2002 | Goldman et al. | |

(Continued)

FOREIGN PATENT DOCUMENTS

FR    2782231 A    2/2000

(Continued)

*Primary Examiner*—Daniel J Colilla (57) ABSTRACT

The present invention relates to a charging stand for charging a mobile phone. The stand includes a base defining a receptacle configured to receive the mobile phone. A battery charging circuit includes a power cord extending into the base, step-down circuitry for reducing supplied voltage from the cord, and exposed contacts configured to supply the reduced voltage to a battery of the mobile phone received in the receptacle. A removable ink cartridge is received in the receptacle and is configured to supply ink to a printer of the mobile phone received in the receptacle.

9 Claims, 7 Drawing Sheets

U.S. PATENT DOCUMENTS

| | | |
|---|---|---|
| 6,478,415 B2 | 11/2002 | Barinaga et al. |
| 6,540,321 B1 | 4/2003 | Hirano et al. |
| 6,742,887 B2 | 6/2004 | Ando |
| 6,766,175 B2 * | 7/2004 | Uchiyama .................. 455/462 |
| 6,782,099 B1 * | 8/2004 | Fischl .................. 379/420.02 |
| 6,916,128 B1 | 7/2005 | Petteruti et al. |
| 2001/0055121 A1 | 12/2001 | Omura et al. |
| 2002/0021320 A1 | 2/2002 | Miyazawa |
| 2002/0158955 A1 | 10/2002 | Hess et al. |
| 2002/0186293 A1 | 12/2002 | Ando |
| 2003/0125075 A1 | 7/2003 | Klovborg |
| 2006/0232645 A1 | 10/2006 | Kumagai et al. |

FOREIGN PATENT DOCUMENTS

| | | |
|---|---|---|
| FR | 2892257 A | 4/2007 |
| JP | 10-285254 | 10/1998 |
| JP | 11-111346 | 4/1999 |
| JP | 2000-010086 | 1/2000 |
| JP | 2000-168104 | 6/2000 |
| JP | 2000-341428 A | 12/2000 |
| JP | 2002-273862 A | 9/2002 |
| JP | 2002-361897 A | 12/2002 |
| WO | WO 00/28379 | 5/2000 |

* cited by examiner

CELLULAR PHONE CHARGING STAND

CROSS REFERENCE TO RELATED APPLICATION

The present application is a continuation of U.S. application Ser. No. 11/474,280 filed Jun. 26, 2006, now issued U.S. Pat. No. 7,431,519, which is a continuation of U.S. application Ser. No. 10/503,901 filed Aug. 9, 2004, now issued U.S. Pat. No. 7,108,437, which is a 371 of PCT/AU03/00170, filed Feb. 12, 2003 all of which is herein incorporated by reference.

FIELD OF THE INVENTION

This invention relates to electronic devices having an internal printer and to a charging assembly for replenishing the internal ink reservoir of the printer.

This application refers to the following co-pending applications of the present applicant, the entire contents of which are duly incorporated herein:—

CO-PENDING APPLICATIONS

Various methods, systems and apparatus relating to the present invention are disclosed in the following co-pending applications filed by the applicant or assignee of the present invention simultaneously with the present application:

| | | | |
|---|---|---|---|
| PCT/AU03/00154 | PCT/AU03/00151 | PCT/AU03/00150 | PCT/AU03/00145 |
| PCT/AU03/00153 | PCT/AU03/00152 | PCT/AU03/00168 | PCT/AU03/00169 |
| PCT/AU03/00170 | PCT/AU03/00162 | PCT/AU03/00146 | PCT/AU03/00159 |
| PCT/AU03/00171 | PCT/AU03/00149 | PCT/AU03/00167 | PCT/AU03/00158 |
| PCT/AU03/00147 | PCT/AU03/00166 | PCT/AU03/00164 | PCT/AU03/00163 |
| PCT/AU03/00165 | PCT/AU03/00160 | PCT/AU03/00157 | PCT/AU03/00148 |
| PCT/AU03/00156 | PCT/AU03/00155 | | |

The disclosures of these co-pending applications are incorporated herein by cross-reference. Each application is temporarily identified by its file reference. This will be replaced by the corresponding PCT Application Number when available.

RELATED PATENT APPLICATIONS AND PATENTS

| | | | | |
|---|---|---|---|---|
| 6,566,858 | 6,331,946 | 6,246,970 | 6,442,525 | PCT/AU01/00141 |
| 09/505,951 | PCT/AU01/00139 | 6,816,968 | 6,757,832 | PCT/AU01/00140 |
| PCT/AU00/00741 | 6,238,044 | PCT/AU00/00742 | 6,425,661 | 6,227,652 |
| 6,213,588 | 6,213,589 | 6,231,163 | 6,247,795 | 6,394,581 |
| 6,244,691 | 6,257,704 | 6,416,168 | 6,220,694 | 6,257,705 |
| 6,247,794 | 6,234,610 | 6,247,793 | 6,264,306 | 6,241,342 |
| 6,247,792 | 6,264,307 | 6,254,220 | 6,234,611 | 6,302,528 |
| 6,283,582 | 6,239,821 | 6,338,547 | 6,247,796 | 6,557,977 |
| 6,390,603 | 6,362,843 | 6,293,653 | 6,312,107 | 6,227,653 |
| 6,234,609 | 6,238,040 | 6,188,415 | 6,227,654 | 6,209,989 |
| 6,247,791 | 6,336,710 | 6,217,153 | 6,416,167 | 6,243,113 |
| 6,283,581 | 6,247,790 | 6,260,953 | 6,267,469 | 6,273,544 |
| 6,309,048 | 6,420,196 | 6,443,558 | 6,439,689 | 6,378,989 |
| 6,848,181 | 6,634,735 | PCT/AU98/00550 | PCT/AU00/00095 | 6,390,605 |
| 6,322,195 | 6,612,110 | 6,480,089 | 6,460,778 | 6,305,788 |
| PCT/AU00/00172 | 6,426,014 | PCT/AU00/00338 | 6,364,453 | PCT/AU00/00339 |
| 6,457,795 | PCT/AU00/00581 | 6,315,399 | PCT/AU00/00580 | 6,338,548 |
| PCT/AU00/00582 | 6,540,319 | PCT/AU00/00587 | 6,328,431 | PCT/AU00/00588 |
| 6,328,425 | PCT/AU00/00589 | 6,991,320 | PCT/AU00/00341 | 6,595,624 |
| PCT/AU00/00340 | PCT/AU00/00749 | 6,417,757 | PCT/AU01/01332 | 7,095,309 |
| PCT/AU01/01318 | 6,854,825 | PCT/AU00/00750 | 7,075,677 | PCT/AU00/00751 |
| 6,428,139 | PCT/AU00/00752 | 6,575,549 | PCT/AU01/00502 | PCT/AU00/00583 |
| 6,383,833 | PCT/AU02/01120 | PCT/AU00/00593 | 6,464,332 | PCT/AU00/00333 |
| PCT/AU00/01513 | 6,428,142 | PCT/AU00/00590 | 6,390,591 | PCT/AU00/00591 |
| 7,018,016 | PCT/AU00/00592 | 6,328,417 | PCT/AU00/00584 | 6,322,194 |
| PCT/AU00/00585 | 6,382,779 | PCT/AU00/00586 | 6,629,745 | PCT/AU00/01514 |
| 6,565,193 | PCT/AU00/01515 | 6,609,786 | PCT/AU00/01516 | 6,609,787 |
| PCT/AU00/01517 | 6,439,908 | PCT/AU00/01512 | 6,684,503 | PCT/AU00/00753 |
| 6,755,513 | PCT/AU00/00594 | 6,409,323 | PCT/AU00/00595 | 6,281,912 |
| PCT/AU00/00596 | 6,604,810 | PCT/AU00/00597 | 6,318,920 | PCT/AU00/00598 |
| 6,488,422 | PCT/AU01/01321 | 6,655,786 | PCT/AU01/01322 | 6,457,810 |
| PCT/AU01/01323 | 6,485,135 | PCT/AU00/00516 | 6,795,215 | PCT/AU00/00517 |
| 7,154,638 | PCT/AU00/00511 | 6,859,289 | PCT/AU00/00754 | 6,977,751 |
| PCT/AU00/00755 | 6,398,332 | PCT/AU00/00756 | 6,394,573 | PCT/AU00/00757 |
| 6,622,923 | | | | |

BACKGROUND OF THE INVENTION

Historically, printers have been desktop devices and have thus been large and immobile. Printers have had large capacity ink cartridges requiring seldom replacement. Replacement ink cartridges are typically kept on hand so that when the current ink cartridge is exhausted it can be replaced with little interruption to the printer operation.

Recent developments have seen printers being incorporated into portable telecommunications devices such as mobile telephones. Examples of such applications can be found in the present applicant's co-pending applications listed above. However, with a portable printer, there is a problem that a replacement ink cartridge will not always be at hand if the ink supply is exhausted. To overcome this problem the ink cartridge will be replaced before it is absolutely necessary resulting in a wastage of ink otherwise there will be a risk that the ink supply will run out, rendering the printer useless until a replacement ink cartridge is found.

SUMMARY OF THE INVENTION

In accordance with a first aspect of the invention, there is provided a charging stand for a mobile telecommunications device having an internal printer, the charging stand including:
- a base;
- a receptacle formed in said base and adapted to releasably receive a mobile telecommunications device;
- a power connection for receiving power with which to provide recharging power to a mobile telecommunication device;
- an ink reservoir storing at least one type or color of ink;
- a power transmission arrangement for providing the recharging power to a mobile telecommunications device when positioned in the receptacle; and
- at least one ink connection adapted to engage complimentary ink receiving connections of a mobile telecommunications device, for providing ink from the at least one ink reservoir to the ink telecommunications device when the telecommunications device is positioned in the receptacle.

Preferably, the power transmission arrangement includes one or more conductive contacts configured to engage complementary conductive contacts on a mobile telecommunications device placed within the receptacle. An electrical circuit can thereby be established for recharging a battery of the telecommunications device.

Alternatively, the power transmission arrangement can include a magnetic field generator for generating an inductive coupling between the stand and a suitable inductive current generation device within the mobile telecommunications device for recharging a battery of the telecommunications device, configured such that the telecommunications device automatically recharges the battery when placed in the receptacle.

Preferably, the power connection is an external power connection for receiving power from a remote source.

It is particularly preferred that the ink reservoir be a removable ink cartridge. In this case, the ink connection includes at least one cartridge connection for engaging at least one corresponding complementary formation on said ink cartridge.

Preferably, the ink reservoir includes a plurality of ink chambers storing distinct ink colours and/or types, each of said chambers including at least one of said ink connections. More preferably, the cartridge includes one or more ink chambers each including an outlet, wherein the cartridge connection includes one or more cartridge pins adapted to be received by said chamber outlets respectively. It is preferred that each of the cartridge outlets include an elastomeric seal.

Preferably, an elastomeric pad surrounds the cartridge pins, or each of said cartridge pins. The pad or pads are compressible to expose the cartridge pins.

In a preferred form, the ink cartridge is configured for reception in said receptacle.

In one embodiment, the charging stand further includes an ink connector including: the ink connections; the ink cartridge connections; and an ink conduit connecting each cartridge connection with a respective ink connection. In this case, the ink connector can be located within the charging stand such that the ink connections and the cartridge connections are disposed in the receptacle.

Preferably, the ink connections include one or more device pins adapted to be received in one or more inlets of said telecommunications device. More preferably, the stand includes an elastomeric pad around the device pins, the pad being compressible to expose the device pins.

In a preferred embodiment, the ink reservoir is disposed on the charging stand such that when a telecommunications device including an internal printer is received in the receptacle, gravity causes ink to flow from the ink reservoir to the printer of the telecommunications device.

In a second aspect, the present invention provides a charging stand for a mobile telecommunications device having an internal printer, the charging stand including a base, a receptacle formed in said base and adapted to receive a mobile telecommunications device therein, an external power connection, a removable ink cartridge storing one or more inks and adapted to be received in said receptacle, one or more power contacts adapted to engage complimentary contacts on said mobile telecommunications device to provide for recharging a battery of said mobile telecommunications device from said external power connection, and an ink connector including one or more cartridge connections adapted to engage complimentary connections on said ink cartridge, one or more device connections adapted to engage complimentary formations on a mobile telecommunications device and one or more ink flow conduits connecting said cartridge connections and said device connections.

In a third aspect, the present invention provides a mobile telecommunications device having an internal printer, the mobile telecommunications device including a power recharge interface and an ink supply interface for accepting recharging power and ink from a charging stand in accordance with any one of the preceding claims.

In a fourth aspect, the present invention provides a recharging device for providing a mobile telecommunications device having an internal printer with recharging power and ink, the recharging device including an ink supply output for releasable connection to a complementary ink supply input of the mobile telecommunications device, and a power recharging output for providing recharging power to the mobile telecommunications device when it is connected to the ink supply output.

Preferably, the recharging device further includes a power supply connection for connecting an external power supply that provides, in use, power to the power recharging output.

More preferably, the power recharging output includes a conductive power supply contact for engaging a corresponding conductive power receiving contact of the mobile telecommunications device.

Alternatively, the power recharging output includes an inductive coupling arrangement for inductively coupling with a corresponding inductive arrangement in the mobile telecommunications device, in use.

BRIEF DESCRIPTION OF THE DRAWINGS

A preferred embodiment of the invention will now be described, by way of example only, with reference to the accompanying drawings, in which.

DESCRIPTION OF PREFERRED EMBODIMENT

Figure 1:
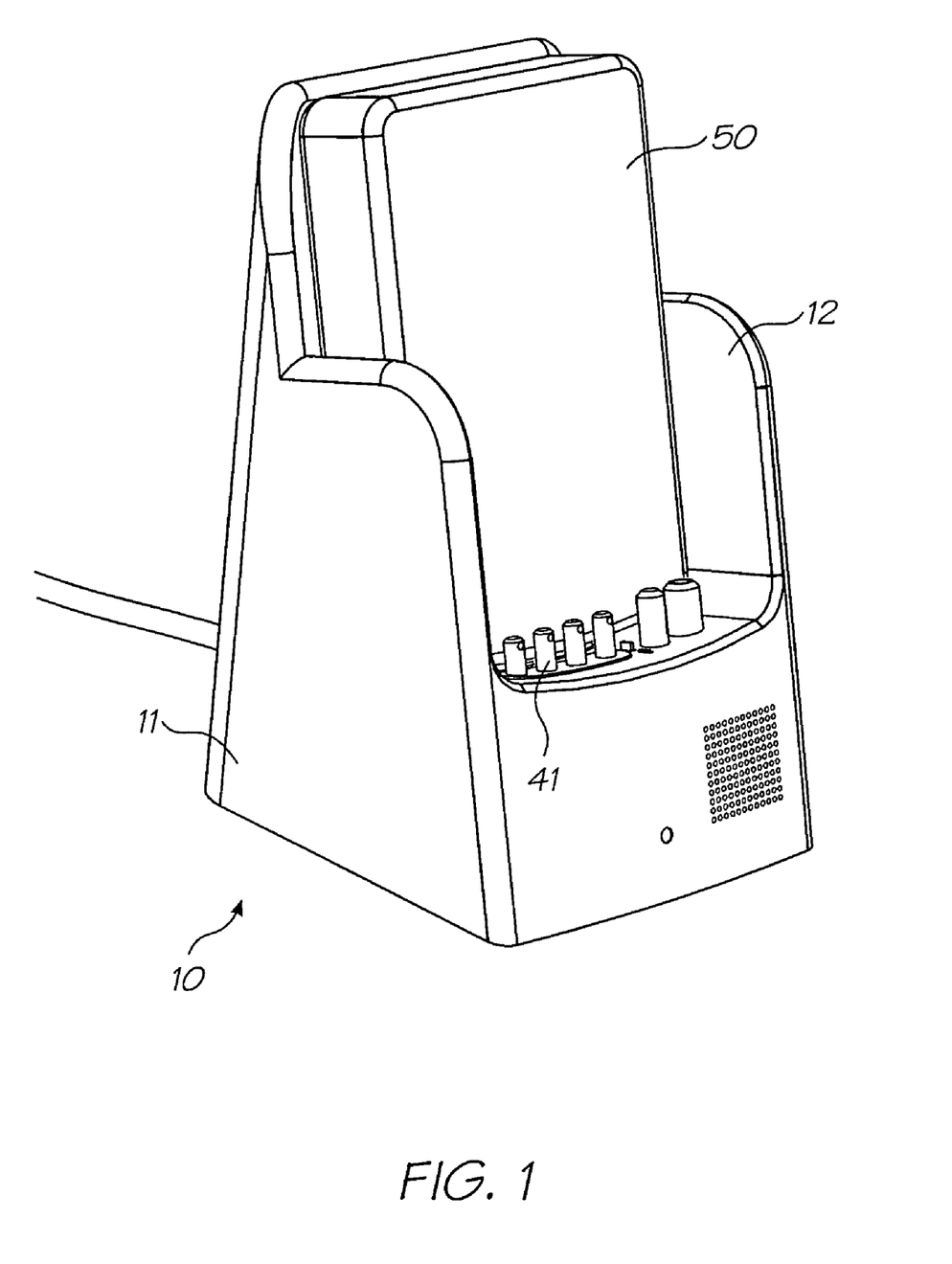
FIG. 1 is a perspective view of a charging stand, in accordance with the invention.
Figure 2:
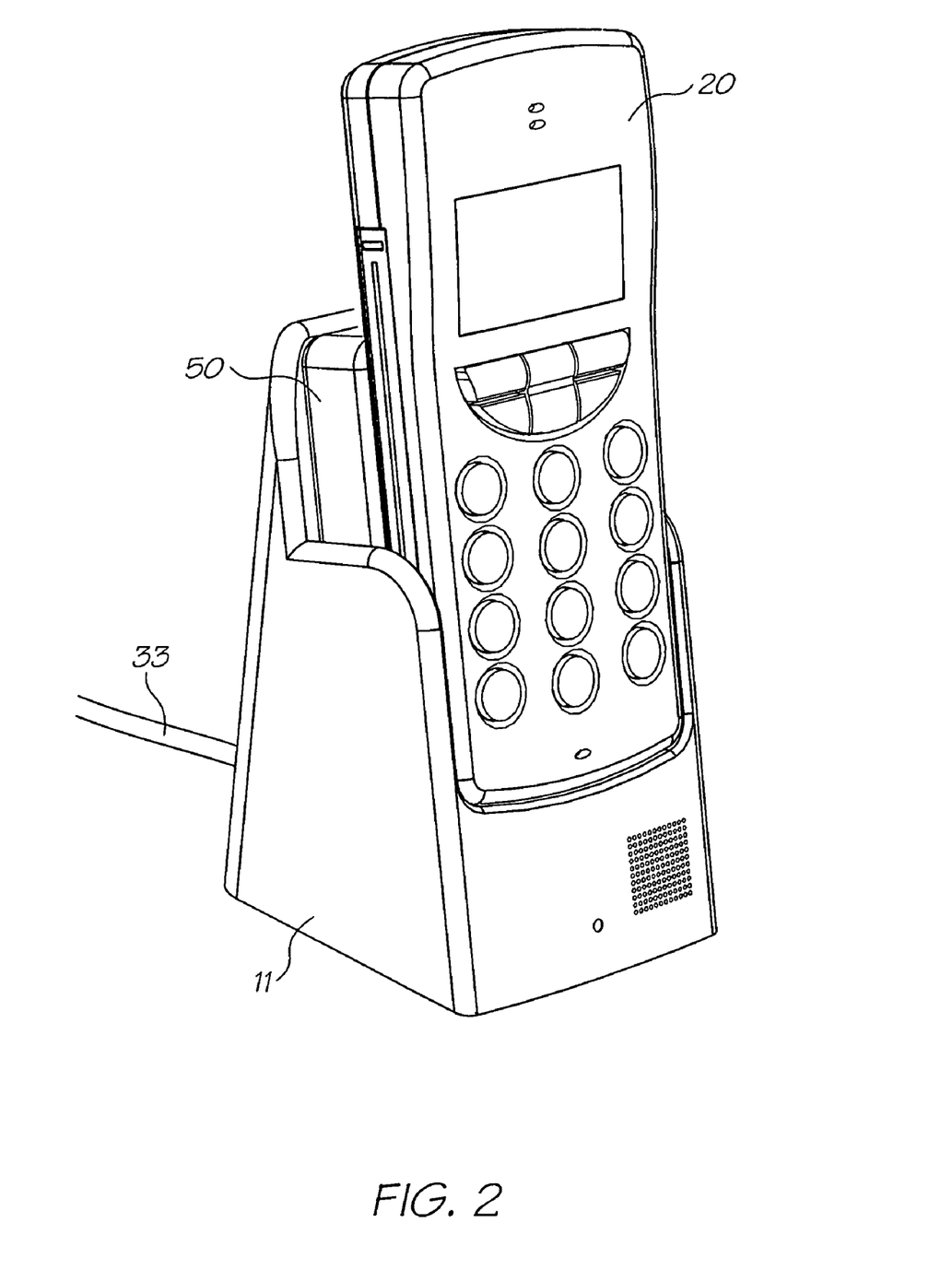
FIG. 2 is a perspective view of a charging stand with a mobile telephone positioned therein.

A charging stand according to the invention is shown generally at 10 in FIG. 1. The stand 10 receives a mobile telecommunications device 20, e.g. a mobile telephone, as depicted in FIG. 2. The stand 10 includes a base 11 with a receptacle 12 that receives the mobile telephone. A set of ink contacts 13 and power contacts 14 are disposed in the base receptacle 12. The base 11 also receives an ink cartridge 50.

Figure 3:
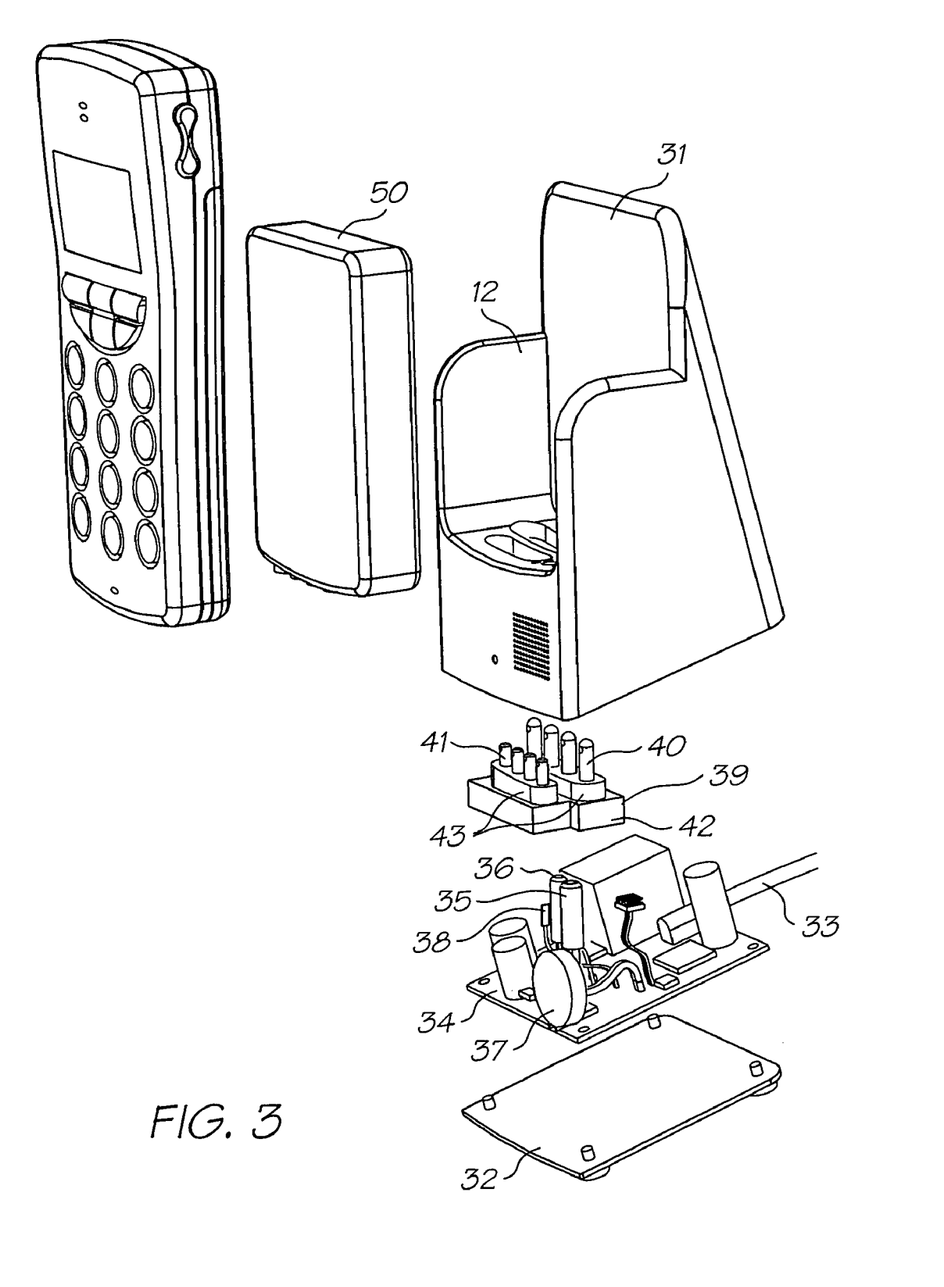
FIG. 3 is an exploded view of the charging stand.

Reference is now made to FIG. 3, which is an exploded view of the charging stand 10 illustrating the internal features. The charging stand 10 includes a base moulding 31 and base plate 32. A power cord 33 passes through an aperture in the base moulding 31 and connects to a Printed Circuit Board (PCB) 34 within the base moulding 31. The opposite end of the power cord 33 includes a standard plug for connection with mains power, which will usually be alternating current (AC). In this case, the power will need to be rectified if it is to be fed to the battery of the mobile telecommunications device in a direct current (DC) form. Alternatively, the charging stand is configured for connection with an alternative power source such as through the cigarette lighter connection of a car, which will usually be direct current (DC). In either case, the power will typically need to be stepped down to provide compatible voltage and current to a battery of the mobile telecommunications device.

The PCB 34 supports components including a power-in plug 35, a speaker plug 36 connected to a speaker 37 and charging contacts 38. The power-in plug 35, speaker plug 36 and charging contacts 38 protrude through the base moulding 31 into the receptacle 12.

The base moulding 31 also houses ink connections 39 that include hollow cartridge connection pins 40 and device connection pins 41 connected through a conduit in an ink connection base 42. Four pins are shown in FIG. 3 that provide an ink flow path for three colour inks and black ink. The cartridge pins and device pins protrude through the base moulding 31 into the receptacle 12. Elastomeric pads 43 are formed around the pins 40, 41 for protection but compress to the configuration depicted in FIG. 3 during loading of an ink cartridge or telephone device into the receptacle, thereby exposing the pins for use. The device pins may be fitted with a cap or seal that prevents ink flow when no device is received in the receptacle but are removed prior to, or in the act of, loading a device into the charging stand.

Figure 4:
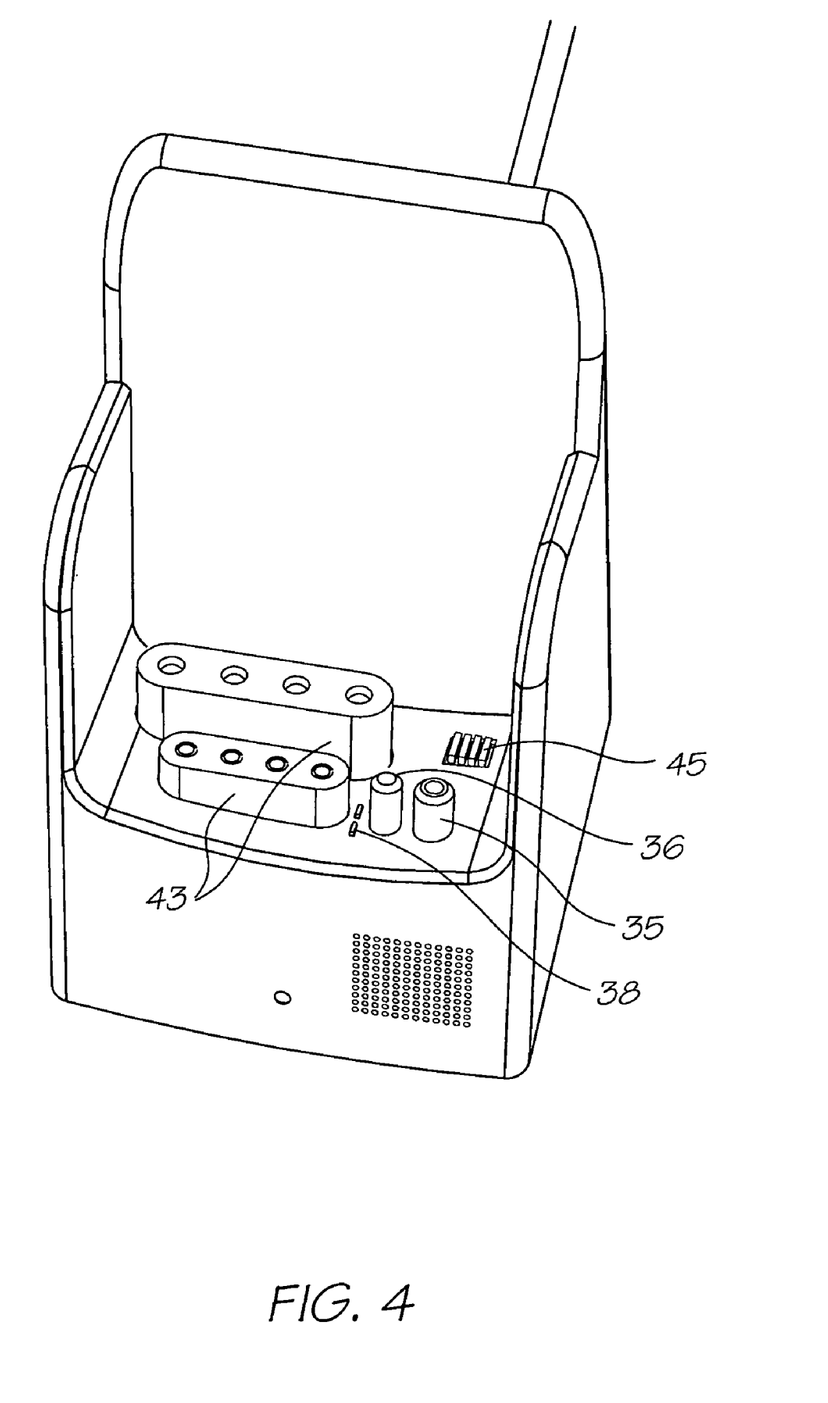
FIG. 4 is an assembled view of the charging stand of FIG. 3.

FIG. 4 demonstrates the resilience of the elastomeric pads 43 once the ink cartridge and telephone have been removed. The pads return to their uncompressed state thereby providing protection to the ink cartridge pins and device pins when the pins are not in use. In addition to providing protection, the elastomeric pads 43 also act to seal the ink flow path through the ink connector 40 thereby preventing any ink trapped within the connector 40 from drying out and potentially causing a blockage. As can be seen from FIG. 4 the power-in plug 35, speaker plug 36 and charging contacts 38 remain exposed.

Figure 5:
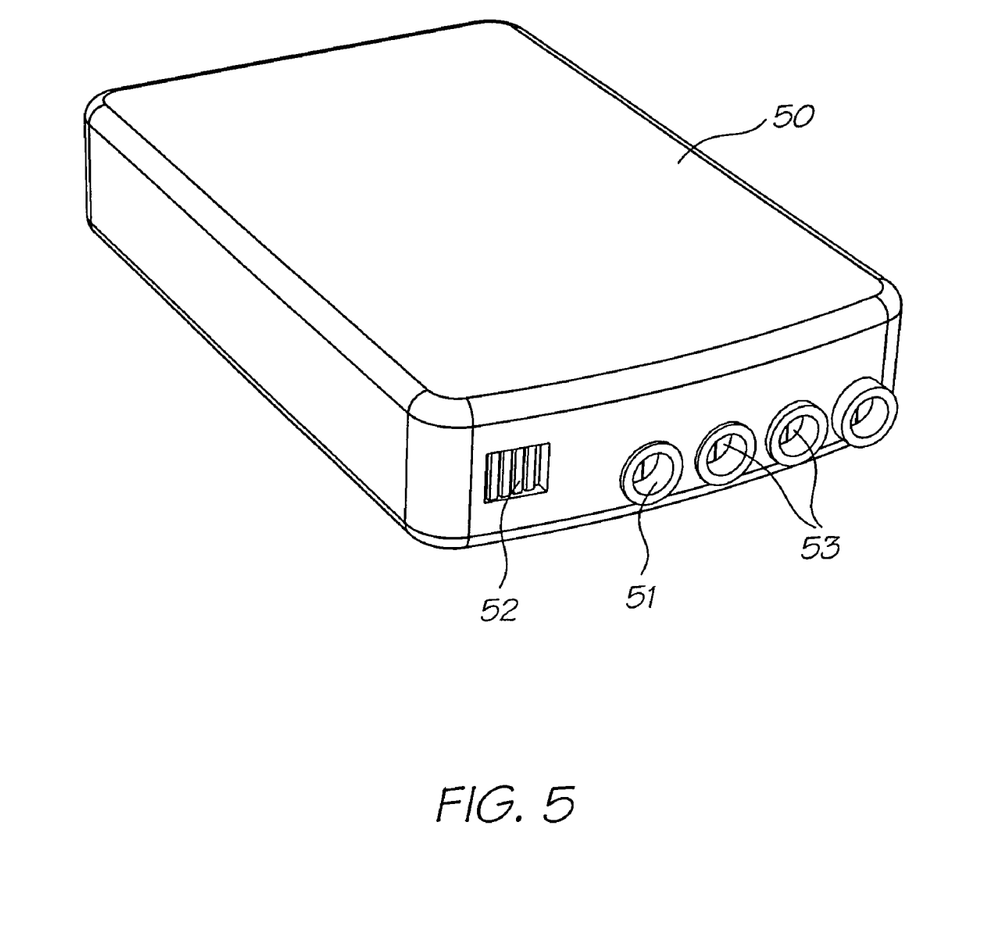
FIG. 5 is a perspective view of a removable ink cartridge.

The charging stand receives a removable ink cartridge 50 of the type illustrated in FIG. 5. The ink cartridge 50 includes an ink reservoir sized to fit into the receptacle 12 of the charging stand. Internally the ink cartridge is divided into four separate chambers for the four different types of ink. Four apertures 51 formed in the end of the cartridge 50 provide an outlet for each of the four chambers and are located on the cartridge 50 so as to receive the cartridge pins 41 of the charging stand when the cartridge is loaded into the receptacle of the charging stand. A seal 53, for example an elastomeric seal, is disposed within each ink chamber about the outlet 51 to seal the respective chamber when the cartridge is removed from the charging stand.

The cartridge 50 may be provided with a QA chip and contacts 52 that communicate with similar contacts 45 (FIG. 4) on the charging stand to ensure that only compatible cartridges 50 are used with the charging stand.

Figure 6:
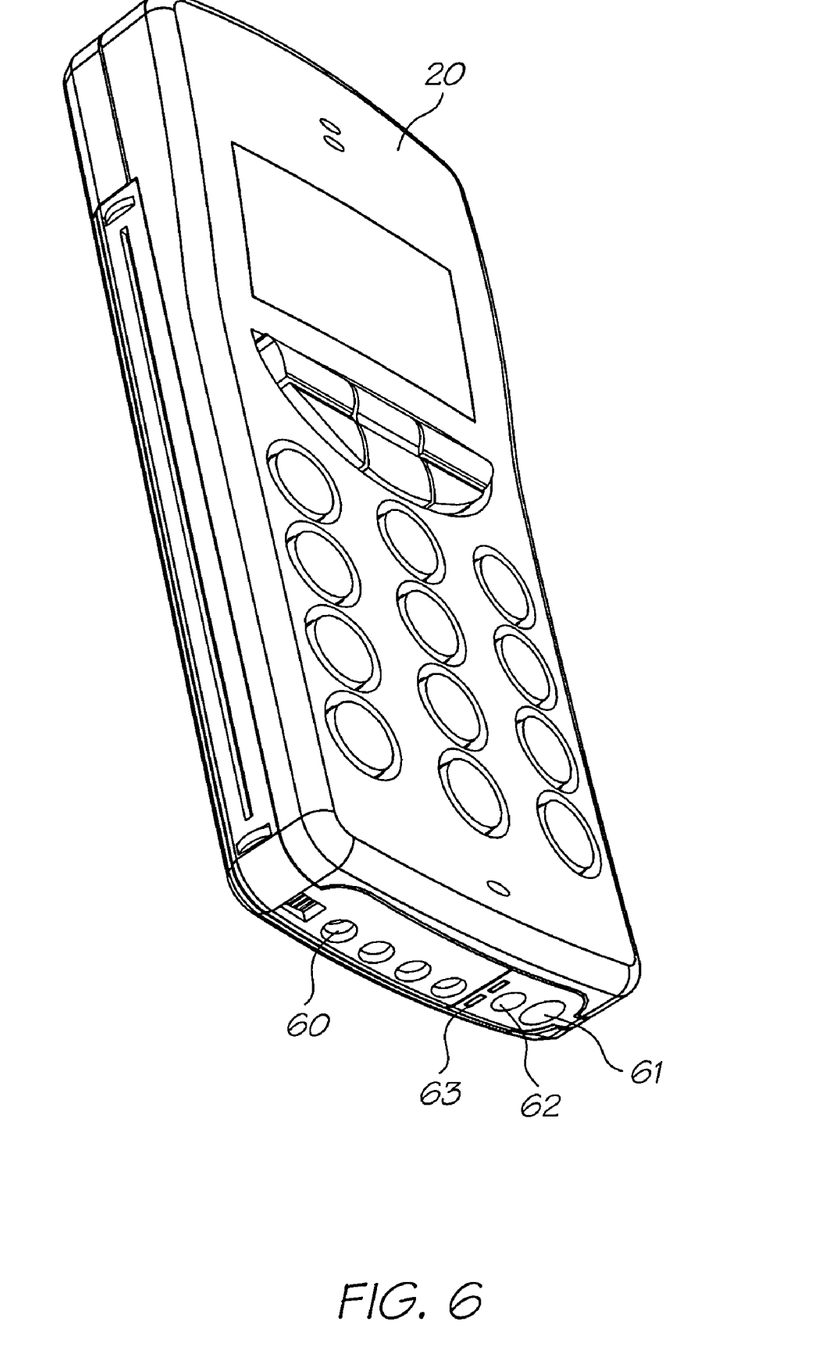
FIG. 6 is a perspective view of a mobile telephone adapted for use with a charging stand of the invention.

The charging stand 10 receives a mobile telephone 20 or like device equipped with an internal printer and battery. As shown in FIG. 6, the telephone 20 includes a series of ink inlet ports 60 that lead to the ink supply systems of the printer, a power socket 61, hands free jack 62 and charging contacts 63 leading to a battery or like charge storage device of the telephone. When the telephone 20 is loaded onto the charging stand receptacle 12 as depicted in FIG. 2, the ink inlets, power socket, hands free jack and charging contacts align with and engage respectively the device pins, power-in connection, speaker plug and charging contacts of the charging stand. Power is then supplied to the telephone both to allow operation of the telephone and to re-charge the telephone batteries in a known manner.

Figure 7:
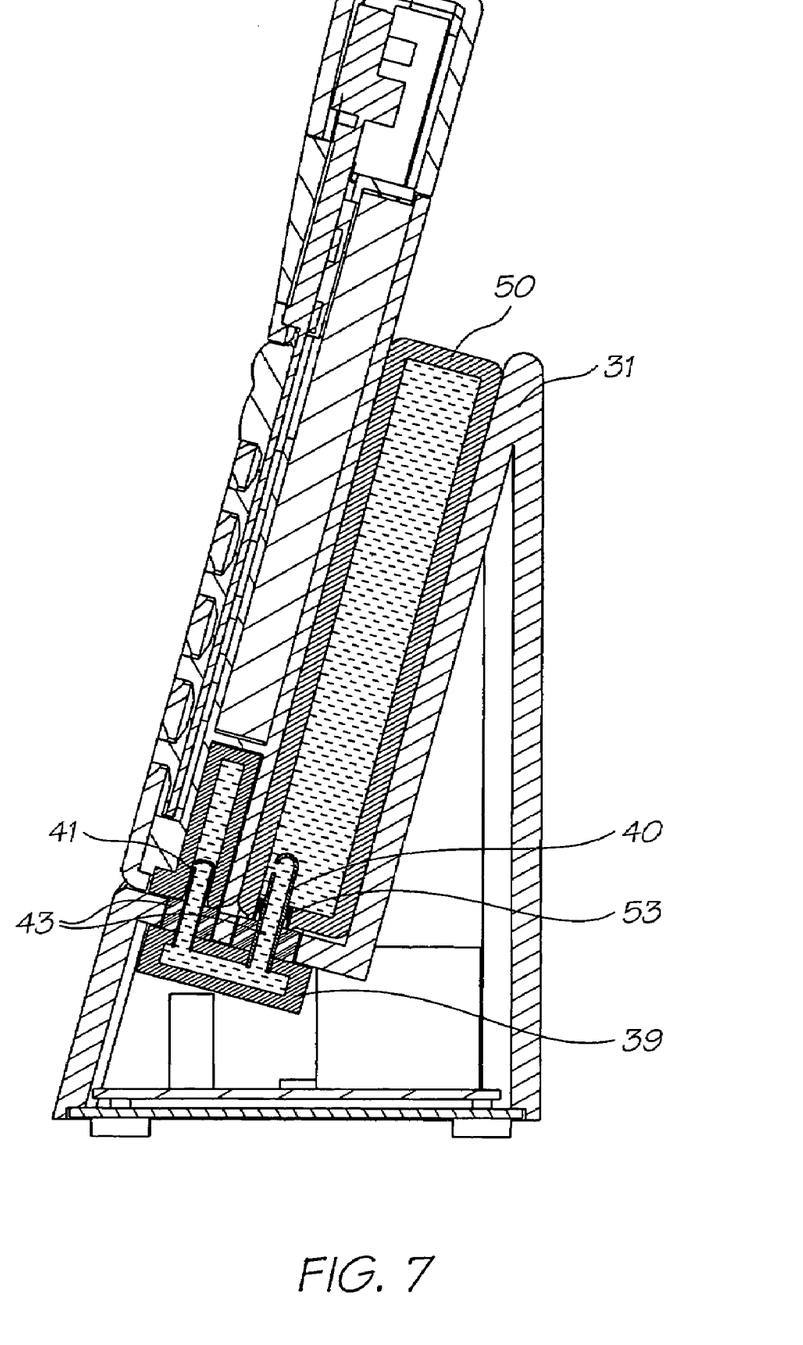
FIG. 7 is a cross section of a charging stand and mobile telephone, in accordance with the invention.

FIG. 7 shows a reverse cross section of the loaded charging stand of FIG. 2 illustrating the connection from the printer of the telephone to the ink cartridge 50. As shown in FIG. 7, the ink cartridge 50 is disposed in the receptacle such that the cartridge pin 40 has penetrated the seal 53 and protrudes into one of the ink chambers of the cartridge. Similarly, the ink inlet ports of the telephone have engaged the device pins of the charging stand. Thus the ink connector 39 provides a conduit from the ink cartridge 50 to the ink reservoirs of the printer. Pressure, gravitational or osmotic effects between the ink chambers of the cartridge and the ink reservoir of the printer causes ink to flow to the printer reservoir.

While the embodiments of the invention have been described with particular reference to mobile telephones, it will be apparent to the skilled addressee that the invention is equally suitable to other types of mobile telecommunications devices such as Wireless Internet Access Devices (WIADs), in particular Wireless Applications Protocol (WAP) terminals, pagers etc.

The charging stand of the present invention allows the battery and ink supplies of a mobile telephone with printer to be re-charged simultaneously. Furthermore, using a charging stand as herein described, it is unlikely that ink supplies of the printer would ever be exhausted as by the time this event occurred, there would be insufficient power in the battery to operate the printer.

The invention has also been described with reference to a four colour printer where the ink cartridge of the charging stand has four chambers for three colour inks and black ink. The configuration of the ink cartridge and the number of pins of the ink connector will depend on the type of printer employed in the mobile telecommunications device. For example the cartridge may store only black ink. Alternatively or in addition, the ink cartridge may include a chamber and ink connection for supplying infra-red ink or some other ink type to a printer.

It will be appreciated that although the preferred embodiment of the invention takes the form of a stand, an alternative embodiment (not shown) is a plug that interfaces with corresponding ink and power sockets in a phone or communications device. An ink reservoir and power supply are still provided, but there is no stand or cradle for the phone to sit in. Rather, once the plug is plugged into the corresponding socket, the phone is simply laid in a suitable place such as a benchtop or desk. A potential advantage of this embodiment is that the ink reservoir (which might be relatively bulky if of high capacity) can be located remotely from the mobile phone charging point, such as on the floor or on a shelf out of the way. In some cases, this can avoid the reservoir being bumped, or at least diminishes the amount of clutter in a work area. The reservoir in this case can also be mounted in the same housing as, or adjacent to, a transformer for rectifying AC mains power for supply to the mobile phone.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

I claim:

1. A charging stand for charging a mobile phone, the stand comprising:
   a base defining a receptacle configured to receive the mobile phone;
   a battery charging circuit including a power cord extending into the base, step-down circuitry for reducing supplied voltage from the cord, and exposed contacts configured to supply the reduced voltage to a battery of the mobile phone received in the receptacle;
   a removable ink cartridge received in the receptacle and configured to supply ink to a printer of the mobile phone received in the receptacle;
   an ink connection pin protruding from the base and in fluid communication with the removable ink cartridge; and
   an elastomeric molding formed around the ink connection pin and covering an outlet of the ink connection pin, wherein
   the elastomeric molding is adapted to compress upon receipt of the mobile phone in the receptacle to expose the outlet of the ink connection pin.

2. A charging stand as claimed in claim 1, wherein the base includes a backrest and a pair of spaced lateral walls extending from the backrest which together define the receptacle, and the ink cartridge is received between the mobile phone and the backrest.

3. A charging stand as claimed in claim 1, wherein the step-down circuitry includes a Printed Circuit Board located within the base and a rectifier mounted to the PCB for rectifying an AC supply voltage to a DC output voltage.

4. A charging stand as claimed in claim 1, wherein the step-down circuitry includes a Printed Circuit Board located within the base and a voltage regulator means mounted to the PCB for regulating an automotive DC supply voltage to a mobile phone DC supply voltage.

5. A charging stand as claimed in claim 1, wherein the base includes a speaker connected to a protruding speaker plug in the receptacle.

6. A charging stand as claimed in claim 1, wherein an inlet connector is located at the base of the receptacle to receive gravity fed ink from the ink cartridge.

7. A charging stand as claimed in claim 6, wherein an outlet connector is located at the base of the receptacle to supply the gravity fed ink to the printer.

8. A charging stand as claimed in claim 7, wherein the connectors each include four passages through which three coloured inks and black ink are transported.

9. A charging stand as claimed in claim 1, wherein a quality assurance integrated circuit arrangement is provided in the base to validate authentic ink cartridges.

* * * * *